United States Patent [19]
Kroisenbrunner

[11] Patent Number: 5,093,209
[45] Date of Patent: Mar. 3, 1992

[54] COMPOUND STEEL WORKPIECE

[75] Inventor: Walter Kroisenbrunner, Kapfenberg, Austria

[73] Assignee: Boehler Gesellschaft m.b.h., Vienna, Austria

[21] Appl. No.: 368,559

[22] Filed: Jun. 20, 1989

[30] Foreign Application Priority Data

Jun. 20, 1988 [AT] Austria .................................. 1595/88

[51] Int. Cl.⁵ ............................................. B32B 15/00
[52] U.S. Cl. ...................................... 428/683; 428/586; 425/168; 425/201; 425/204; 228/131; 228/193; 228/126; 228/235
[58] Field of Search ................ 428/683, 586; 425/168, 425/207, 204; 228/131, 193, 126, 235; 148/11, 5 Q, 12 B

[56] References Cited

U.S. PATENT DOCUMENTS

| | | |
|---|---|---|
| 4,314,007 | 2/1982 | Gessinger .......................... 428/683 |
| 4,943,489 | 7/1990 | Kuhara et al. ...................... 428/586 |

FOREIGN PATENT DOCUMENTS

| | | | |
|---|---|---|---|
| 233437 | 8/1987 | European Pat. Off. ............ | 428/586 |
| 2358362 | 5/1975 | Fed. Rep. of Germany ...... | 425/204 |
| 2801499 | 7/1979 | Fed. Rep. of Germany ...... | 425/207 |
| 53-19958 | 2/1978 | Japan .................................. | 228/131 |

*Primary Examiner*—Deborah Yee
*Attorney, Agent, or Firm*—Fleit, Jacobson, Cohn, Price, Holman & Stern

[57] ABSTRACT

A compound steel workpiece and a process for its production, wherein a support jacket is provided with at least one recess, which in turn is furnished with a lining resistant to attrition and corrosion, which lining is connected to the support jacket by a metal bond. In the process, which has particular application in the production of double or multiple screw cylinders for use in plastics processing, the support jacket is provided with at least one core at the point(s) at which the recess(es) are desired, is subjected to hot-forming, along with the core(s), at an appropriate temperature, in particular for cross-sectional reduction a cross-sectional shape deviating from that of a circle is imparted to the core(s) and the recess(es) are created in the core(s).

25 Claims, 2 Drawing Sheets

COMPOUND STEEL WORKPIECE

BACKGROUND OF THE INVENTION

The invention relates to a workpiece or a machine part of compound steel, comprising a support jacket having at least one longitudinal recess and whose preferred shape is cylindrical over at least one portion of its exterior surface, wherein the recess(es) are furnished with at least one attrition-resistant and/or corrosion-resistant lining over the circumference, and a metal bond or connection with the support jacket is produced by pressing, forging, rolling, or the like.

Due to internal pressures ranging from 1000 to 2000 bar, the frequently high level of corrosion, and not least of all due to the fillers used, e.g. in plastics processing, compound steel workpieces and machine parts of this type are subject to high levels of attrition. It has been shown that certain filling materials, e.g. fiberglass, can reduce the service life of these parts 1/10 of their original value. Inasmuch as the maximum admissible play between screw and cylinder in injection molding machines is 0.25 mm, it is possible to estimate the significance of the attrition factor; machine manufacturers consequently have taken great efforts to resolve this technical problem.

BRIEF SUMMARY OF THE INVENTION

The object of the invention is to create an easily performed process for the production of workpieces of compound steel which are inwardly resistant to corrosion and/or attrition and which meet all requirements imposed on them during operation. In particular, the compound steel workpieces must fulfill the operating requirements of form or shape and must simultaneously possess the needed strength.

This object is achieved in a compound workpiece of the invention, particularly in creating a double or multiple screw cylinder for use in plastics processing, in that the recess formed in the support jacket displays a cross-sectional shape that deviates from that of a circle, e.g. displays the shape of at least two overlapping circles, and that the circumferential surface of the metal bond between the lining, whose shape in section also deviates from that of a circle, and the support jacket lies at varying standard distances from the circumferential surface of the support jacket. In an alternative design, particularly for the creation of a double or multiple screw cylinder for use in plastics processing, the circular recess within the support jacket is eccentrically positioned relative to the center of the support jacket, and the circumferential surface of the metal bond between the lining, whose section also has a circular shape, and the support jacket lies at varying standard distances from the circumferential surface of the support jacket.

The process of the invention, particularly for the creation of a double or multiple screw cylinder of compound steel, is characterized in that the support jacket, which is furnished with at least one core at the point(s) at which the recess(es) are-desired, is subjected to deformation at a high temperature, along with the core(s), and in particular is subjected to a reduction in cross-section; in that a cross-sectional shape deviating from that of a circle is imparted to the core(s); and in that the recess(es) are formed within the core(s). In an alternative design, particularly for the creation of a double or multiple screw cylinder of compound steel for use in plastic processing, the support jacket, which is furnished with at least one core at the point(s) at which the recess(es) are desired, is subjected to hot-forming, along with the core(s), and in particular is subjected to a reduction in cross-section, resulting in a circular core which is eccentrically positioned relative to the center of the support jacket or whose position lies at varying distances from the circumferential surface of the support jacket, whereupon the recess(es) are formed in the core.

Basically all requirements with respect to form and strength imposed in operation can be fulfilled by the compound steel workpiece according to the invention.

BRIEF DESCRIPTION OF THE DRAWINGS

Preferred embodiments of the invention will now be described in detail in the following description with reference to the accompanying drawing wherein.

DETAILED DESCRIPTION

The invention process begins with the production of a support jacket which is provided with a core; the support jacket provided with a core is subjected to a reduction in cross-section at increased temperature in order to create a metal bond between the core and the support jacket. To this end a hole (or several holes) are drilled or worked into a metal bar or metal section representing the support jacket, and one or several metal rods representing the core(s) are inserted into the hole(s), after the inner surface of the support jacket and the outer surface of the core(s) have been cleaned. After applying a vacuum, the ends of the support jacket are sealed and made air-tight to prevent oxidation in the subsequent heat treatment and to create the metal bond at the treatment temperature, which preferably lies between about 1000° and 1260° C.

Figure 1A:
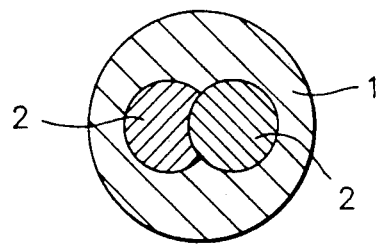
FIG. 1a is a cross-sectional view showing an intermediate stage in the production of the workpiece in accordance with the invention.
Figure 1B:
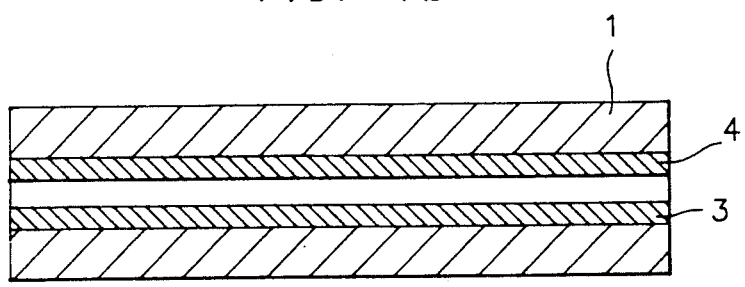
FIG. 1b is a longitudinal cross-sectional view showing the workpiece produced in accordance with invention.
Figure 1C:
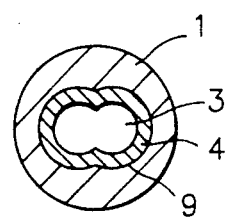
FIG. 1c is a transverse cross-sectional view of FIG. 1b.

FIG. 1a shows the section through a compound steel cylinder for use in plastics processing, with a support jacket 1 and an inserted two-part core 2. This workpiece was produced by drilling an eccentrically positioned hole in a cylindrical metal bar, inserting a core 2 into this bore, and then drilling a second hole that overlaps with the first one. The core 2, which was partially abraded during application of the second bore, and a second core 2 were washed, as were the inner surface of the bores (e.g. with alcohol, trichloroethylene, or the like), and were reinserted into the bores. After sealing the ends, e.g. by welding a plate thereto, and evacuation of air, the workpiece was subjected to hot-forming or cross-sectional reduction at 1180° C., i.e. to hot-forging. The result was the compound steel workpiece shown in FIGS. 1b and 1g, in which the cores 2 and the support jacket 1 are held together by means of a metal bond. Two additional overlapping bores applied to the cores 2 resulted in the recess 3, which is surrounded by a lining 4 of core material.

Surprisingly, it was discovered that the material of the two cores forms a metal bond despite their high carbon or carbide content. The recess 3 formed by the two overlapping bores and surrounded by the lining 4—which lining forms a metal bond with the support jacket 1—is enclosed by the material of the two cores; a metal bond was produced between the two cores, resulting in a single-piece lining 4 which in turn is connected with the support jacket 1 by means of metal bond 9. Due to this structure, the stresses arising in the hard metal lining material, which is rich in carbon and/or carbide, can be successfully absorbed by the tough alloy material of the support jacket 1, and tears and cracks in the lining 4 can be avoided. Since the cross-sectional reductions performed in the forging, pressing, or rolling stages can be successfully controlled, the deformation of the cores inserted into the support jacket and performed at a suitable temperature occurs with relative uniformity, and the cross-sectional form of the cores is approximately or, as the case may be, fully maintained; thus circular holes can be drilled in cores that were originally circular, thereby permitting a lining 4 of fundamentally uniform thickness. Due to the fusion of core parts 2 and the fit between the non-circular lining 4 and the non-circular form of the recess 3, stresses resulting from the unequal thickness of the lining 4 can be largely avoided, or can be uniformly displaced to the support jacket.

Figure 2A:
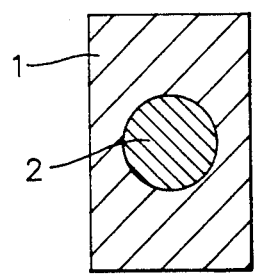
FIG. 2a is a view similar to FIG. 1a showing the same components having a different shape.
Figure 2B:
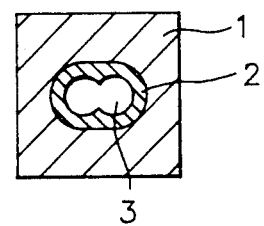
FIG. 2b is a view similar to FIG. 1c showing the embodiment of FIG. 2a in a final stage.

FIG. 2a shows a section through a support jacket 1 of rectangular cross-sectional shape, in the middle of which a round core 2 has been inserted. Hot-forming of the support jacket 2 produces the approximately square support jacket cross-section shown in FIG. 2b, with a core of elongated, oval, or elliptical shape. Two overlapping holes are then bored and a recess 3 is produced such as that required, for example, to receive a double screw in plastics processing.

Figure 3A:
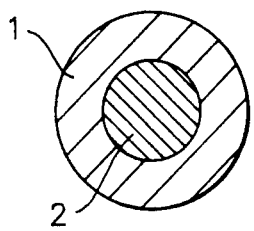
FIG. 3a is a view similar to FIG. 2a but wherein the workpiece has a circular cross-sectional form.
Figure 3B:
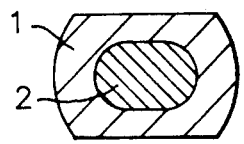
FIGS. 3b and 3c show the workpiece of FIG. 3a in successive stages of production.
Figure 3C:
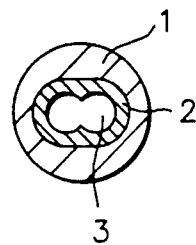

In the preferred procedure the following formulas are employed:

$$K = \sqrt{V\left(\frac{4 \times D + D^2 T}{T}\right)}$$

$$H = \frac{K \times S}{D}$$

$$B = K + S - x - D$$

where $K$ = core $\phi$
$x$ = axial distance
$D$ = enlarged borehole
$V$ = degree of forging
$H$ = rough size — height
$B$ = rough size — width $S$ = lateral length of square after forging FIG. 3a shows a cylindrical support jacket 1 in which a round core 2 is inserted in basically concentric fashion. The support jacket is deformed into a cylinder 11 flattened on opposite sides, e.g. by means of pressing at increased temperature. Overlapping recesses 3 (FIG. 3c) are bored in the oval or elongated core 12 shown in FIG. 3b. The compound steel workpiece shown in FIG. 3b can then be machined into the workpiece shown in FIG. 3c.

It was discovered that non-circular and off-center recesses could easily and precisely be created according to the invention procedure.

Figure 6:
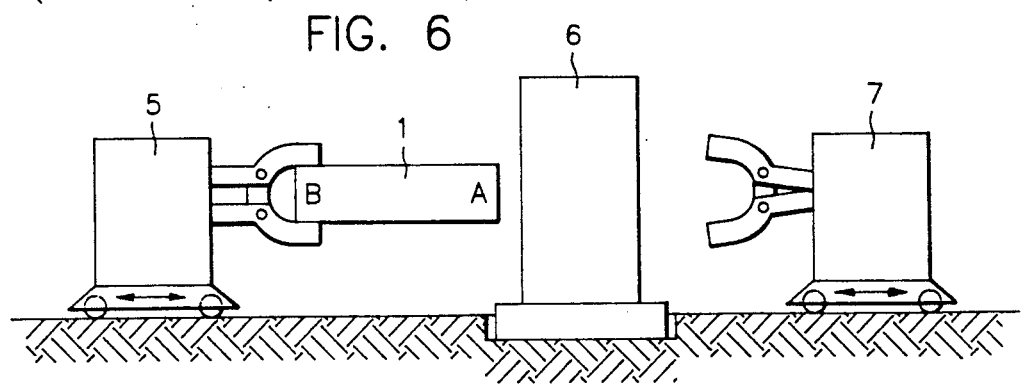
FIG. 6 is a schematic elevational view showing an apparatus for implementing the process in accordance with the invention.

Usually the deformation or cross-sectional reduction of the workpieces is performed by forging, pressing, or rolling at increased temperatures. If a compound steel workpiece like that shown in FIG. 2a is to be forged, the piece is clamped in a manipulator 5, as shown in FIG. 6. The manipulator conducts the workpiece 1 to a long-forging machine 6, from which it passes on to another manipulator 7. The manipulators 5, 7 serve to conduct and transport or to twist the workpiece during the long-forging process. In order to prevent the twisting of the workpiece, or of its non-circular core, that arises during forging with manipulators in long forging—after which it would be impossible to drill the core—ends A and B of the workpiece, according to the invention, are alternately introduced into the long-forging machine, i.e. the workpiece is rotated 180° after each pass and then introduced anew into the forge, thereby largely preventing the undesired twisting of the core. The individual passes continue under equal conditions, in particular with an equal forward feed or equal torsion. To be sure, the degree of cross-sectional reduction or of deformation can be varied in order to take into account the deformation or change in cross-section that arose in the previous pass and to thereby assure equal deformations or cross-sectional changes in the sequence of passes.

It is of advantage to employ forging presses with upper and lower dies, or double and multiple hammer forges with conical hammers, or presses with conical dies. Cross-sectional reduction by means of rolling is particularly suited for the production of long compound steel workpieces.

Figures 4A, 4B, 4C, 4D, 4E:
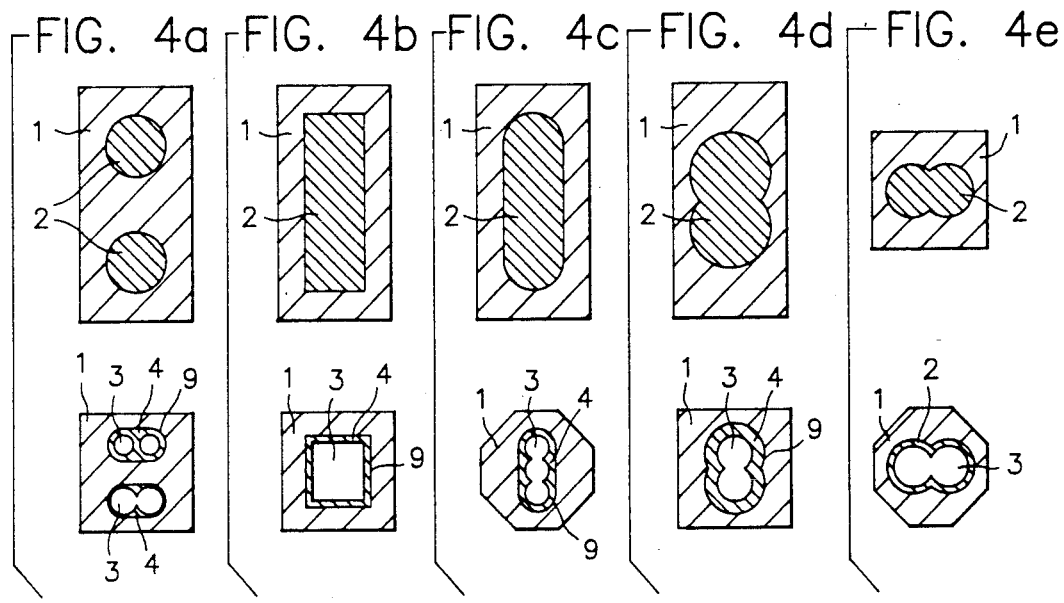
FIGS. 4a, 4b, 4c, 4d and 4e show cross-sectional views similar to FIGS. 1a and 1c of various basic shapes and final products in accordance with the invention.

The upper row of FIG. 4 depicts various basic shapes for support jackets 1 provided with cores 2; the lower row shows various compound steel workpieces after cross-section reduction, with recesses 3 that are bordered by the core 2 residues representing the lining 4. The compound steel workpiece in FIG. 4a shows two inserted cores which were deformed into ellipses in the course of deforming the support jacket 1 into a square; two independent recesses 3 and two overlapping recesses 3 were built into the cores.

The rectangular support jacket in FIG. 4b shows a basically rectangular core 2. After reducing the cross-section, a basically rectangular recess 3 was worked into the core material, e.g. by means of electroerosion.

The compound steel work piece in FIG. 4c shows a rectangular support jacket 1, into which an oval or elongated core was inserted; the workpiece depicted was produced by drilling out three overlapping recesses 3.

FIG. 4d and 4e in particular reveal that the form of the core inserted into the support jacket 1, as well as the type of cross-sectional reduction, influence the form of the recessed lining in the finished compound steel workpiece. In the compound steel workpiece shown in FIG. 4d it is apparent that the circumference of the lining 4 resembles the shape of the core 2; this is also evident in the compound steel workpieces in FIGS. 4c and 4e, which were reduced in cross-section from a rectangular and square form to an octagonal one.

In forging the support jackets the preferred procedure is to employ two smooth forging jaws and two cambered forging jaws; here the cambered forging jaws particularly act upon the side parallel to the longitudinal axis of the cores(s).

Figures 5A, 5B, 5C, 5D, 5E:
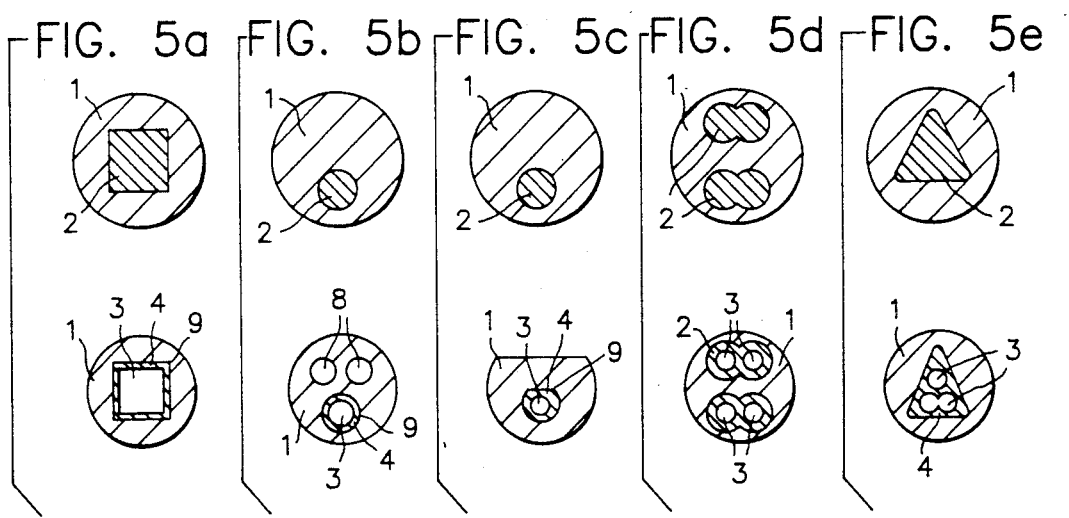
FIGS. 5a, 5b, 5c, 5d and 5e show further various basic shapes and final products in cross-sectional views.

FIG. 5 gives a view of compound steel workpieces which were produced from support jackets 1 of circular cross-section. FIG. 5a shows a support jacket with a rectangular core, into which a rectangular recess 3 was formed after deformation and production of the metal bond. The compound workpiece in FIG. 5b was formed from a support jacket 1, into which a circular core was fitted asymmetrically. Cross-sectional reduction at increased temperature and drilling were used to produce the asymmetrically positioned, basically circular recess 3, which is surrounded by a lining 4. Additional recesses 8, without linings, were subsequently produced in the support jacket 1. The compound steel workpiece in FIG. 5c was created from an asymmetrically positioned circular core; asymmetrical reduction of the support jacket 1 cross-section resulted in an asymmetrically shaped lining 4 of the recess 3 produced in the core material.

As the compound steel workpiece in FIG. 5d shows, it is also possible to insert several cores into a circular support jacket 1, which are themselves composed of several parts, and then, after deformation, to provide these cores with overlapping or separated recesses 3. The compound steel workpiece in FIG. 5e consists of a support jacket 1 with a triangular core, with recesses 3 applied after deformation.

If, in applying the cores 2 to the support jacket 1 or in applying the recesses 3 to the deformed cores, two or more overlapping boreholes are to be created, the preferred procedure is first to complete the bore, then to insert the core into this hole, then to complete the second bore and to insert into it the core supplementing the first, partially dressed core. The first core must be protected against torsion, e.g. by means of a fitting-bore drilled at the border between the core and the support jacket, and by means of a fitting-pin inserted into the fitting-bore; and it must be protected against displacement, e.g. by means of a bore, with inserted screw, positioned at the border. The cores cannot be protected by means of welding if one or more heat-treatable steels are employed. Since drilling require the use of drilling oil, the cores, as well as the inner surface of the support jacket, must be cleaned before the metal bond 9 is created. In order to protect the cores, from oxidation during hot-forming, the outside ends of the compound steel workpiece are sealed before the deformation process begins.

The hot-forging, pressing, or rolling used to produce the metal bond is performed at temperatures between 1000° and 1260° C., particularly between 1170° and 1190° C.

The possibility of varying the position of the core in relation to the center or outer surface of the support jacket is of special importance if the completed compound steel workpiece is to be subjected to e.g. mechanical tooling, for example to allow its use in cooling, heating, or holding equipment. The possibility of fitting the core in whatever position desired relative to the center or outer surface of the support jacket, and to thereby assure that the compound steel cylinders have good mechanical properties, was previously unknown to the art or was impossible due to stresses arising in the support jacket and lining. Under the invention it is possible to produce non-uniform recesses 3 with relatively thin linings 4, especially recesses 3 whose shape deviates from that of a circle, in a procedure that eliminates the risk of distortion during changes in temperature and the risk of fracture in linings that are too thick, or at points in the lining that are too thick, as such risks arise in operation and when an elongated recess is created in a circular core.

When the object is to insert non-circular cores into bores in the support jacket, it is possible, e.g. by means of shape-cutting, to form recesses of square, rectangular, or alternative shape, into which are inserted properly fitted cores, produced e.g. by means of extrusion, of corresponding square, rectangular, or alternative shape.

The recesses 3 created in compound steel workpieces can also have a cross-section that tapers conically in the longitudinal direction; this can be achieved by applying stepped or graded bores, which are then conically hollowed by turning.

It is advantageous if the support jacket 1 consists of a forgeable and heat-treatable alloy of high strength and toughness, e.g. structural steel or case hardened steel, and if the lining 4 consists of a forgeable and heat-treatable alloy, preferably resistant to wear and corrosion, e.g. ledeburitic chrome steel, preferably with at least 11% Cr, particularly with at least 14% Cr, and at least 1% C, preferably with at least 1.8% or 2.3% C, and if the support jacket 1, along with the lining 4, is deformed by means of cross-sectional reduction in order to create the metal bond between these alloys. These steels each possess the necessary hardness and toughness to optimally support one another; in particular the meal bond between these alloys is easily created. These alloys also deform together well at certain temperatures, and the compound piece thus produced can then be successfully hardened. Naturally these alloy types can also be modified through the addition of one or several other alloying elements; among those particularly suited for addition to ledeburitic chrome steel are Mo, V, W, and Co up to a total of 12%, and for non-rusting Cr steels, Mo, Ni, V, W, Ti, and Nb up to about 6%.

I claim:

1. Compound steel workpiece comprising:
    an elongated support jacket having a cylindrical shape over at least a portion of the exterior surface thereof;
    at least one longitudinal recess in said support jacket;
    at least one attrition resistant and/or corrosion resistant lining between said recess and said support jacket formed from a core in said support jacket; and
    a metal bond between said lining and said support jacket formed by pressing, forging, or rolling said support jacket with said core therein.

2. A compound steel workpiece as claimed in claim 1 wherein:

said lining has an inner surface having a non-circular cross-sectional shape forming said at least one recess; and said lining has an outer surface having a non-circular cross-sectional shape;

said outer surface of said lining being spaced at varying normal distances from the exterior surface of said support jacket.

3. A compound steel workpiece as claimed in claim 2 wherein:

said at least one recess has a cross-sectional shape of at least two overlapping circles.

4. A compound steel workpiece as claimed in claim 1 wherein:

said at least one recess is positioned eccentrically with respect to the central axis of said support jacket.

5. A compound steel workpiece as claimed in claim 3 wherein:

said at least one recess is positioned eccentrically with respect to the central axis of said support jacket.

6. A compound steel workpiece as claimed in claim 2 wherein:

said at least one recess and said lining have a common central axis of symmetry.

7. A compound steel workpiece as claimed in claim 3 wherein:

said at least one recess and said lining have a common central axis of symmetry.

8. A compound steel workpiece as claimed in claim 1 wherein:

said lining has a shape substantially conforming to the peripheral shape of said at least one recess and has a substantially uniform thickness over the entire extent thereof.

9. A compound steel workpiece as claimed in claim 1 wherein:

said at least one recess and said lining are symmetrical with respect to the central axis of said support jacket.

10. A compound steel workpiece as claimed in claim 1 wherein:

said support jacket is comprised of a forgeable and heat-treatable alloy material selected from the group consisting of structural steel and casehardenobleable steel; and said lining is comprised of a forgeable and heat-treatable alloy material selected from the group consisting of ledeburitic chrome steel, steel having at least 11% Cr and at least 1% C, steel having at least 14% Cr and at least 1.8% C, and steel having at least 14% Cr and at least 2.3% C.

11. Compound steel workpiece as claimed in claim 2 made by the process comprising:

providing a metal support jacket body;

forming at least one aperture in said body;

inserting a metal core into said at least one aperture at a position where said recess is desired;

hot forming said body with said core therein at high temperature to produce a reduction in cross-section of said body and core and simultaneously form said metal bond between said core and said body;

forming said at least one recess in said core to produce said lining from said core around said at least one recess.

12. A compound steel workpiece made by the process as claimed in claim 11 wherein:

said hot forming further comprises shaping said core into a non-circular cross-sectional shape.

13. A compound steel workpiece made by the process as claimed in claim 11 wherein:

said recess forming step comprises machining said recess in said core.

14. A compound steel workpiece made by the process as claimed in claim 11 wherein:

said step of forming at least one aperture comprises forming a second aperture in said body after said core inserting step and before said hot forming step, so that said second aperture overlaps said inserted core and aperture therefor;

a second metal core is inserted into said second aperture; and said recess forming step comprises forming overlapping holes in said cores to form a recess having a cross-sectional shape in the form of overlapping circles.

15. A compound steel workpiece made by the process as claimed in claim 11 wherein:

said at least one aperture forming step comprises forming an aperture having a substantially elliptically shaped cross-section; and said hot forming step is carried out which substantially maintain the outer cross-sectional shape of the body.

16. A compound steel workpiece made by the process as claimed in claim 11 wherein:

said aperture forming step comprises forming an aperture having a substantially circular cross-sectional shape; and said hot forming step comprises forming said body to reduce the cross section thereof and form the core into a non-circular cross-sectional shape.

17. A compound steel workpiece made by the process as claimed in claim 11 wherein:

said hot forming step comprises:

forging said body by passing said body in an even number of passes through a forging machine; and rotating said body end to end 180° after each pass so that alternate ends are introduced as leading ends after each pass.

18. A compound steel workpiece made by the process as claimed in claim 17 wherein:

a substantially uniform reduction in cross-section and substantially the same degree of deformation is imparted to said body in each two successive passes.

19. A compound steel workpiece made by the process as claimed in claim 11 wherein:

said hot forming step comprises applying deformation forces distributed substantially uniformly on the outer surface of said body.

20. A compound steel workpiece made by the process as claimed in claim 11 and further comprising:

mechanically tooling the outer surface of said body after said hot forming step.

21. A compound steel workpiece made by the process as claimed in claim 11 wherein:

said hot forming comprises reducing the cross-section of said body at least 20%.

22. A compound steel workpiece made by the process as claimed in claim 11 wherein:

said hot forming step comprises pressing said body at a temperature in the range of 1000° C. to 1260° C.

23. A compound steel workpiece as claimed in claim 11 and further comprising:

heat treating said compound workpiece made by the process by hardening and tempering.

24. Compound steel workpiece comprising:

an elongated support jacket having a cylindrical shape over at least a portion of the exterior surface thereof;

a plurality of longitudinal recesses in said support jacket;

a separate attrition resistant and/or corrosion resistant lining encompassing each recess between said recesses and said support jacket, said linings being formed from cores in said support jacket; and a metal bond between each lining and said support jacket formed by pressing, forging, or rolling said support jacket with said cores therein.

25. Compound steel workpiece comprising:

an elongated support jacket having a cylindrical shape over at least a portion of the exterior surface thereof;

a plurality of longitudinal recesses in said support jacket;

a common lining encompassing said plurality of recesses between said recesses and said support jacket, said lining being formed from cores in said support jacket; and a metal bond between each lining and said support jacket formed by pressing, forging, or rolling said support jacket with said cores therein.

* * * * *